Jan. 9, 1968  E. F. CARLISLE  3,362,653

EASY, QUICK CHANGE ROLL ROLLER

Filed Aug. 23, 1966

INVENTOR
EDWARD F CARLISLE

United States Patent Office 3,362,653
Patented Jan. 9, 1968

3,362,653
EASY, QUICK CHANGE ROLL ROLLER
Edward Franklin Carlisle, 8435 SE. Hinkley,
Portland, Oreg. 97266
Filed Aug. 23, 1966, Ser. No. 574,363
1 Claim. (Cl. 242—55.2)

ABSTRACT OF THE DISCLOSURE

A toilet tissue roller, including a cylinder element and a plunger element, an internal compression coil spring normally urging the elements apart, and a snap ring received in the cylinder element and retaining said elements assembled during normal use.

---

This invention relates generally to rollers for supporting rolls of toilet paper during operative use.

A principal object of the present invention is to provide a novel roller for supporting rolls of toilet tissue, and which has self-contained means to permit an easy and quick change from an empty roll to a full roll of toilet tissue.

Another object of the present invention is to provide an easy, quick change roll roller which is formed of principally two basic elements, each one of which is receivable into opposite ends of a toilet tissue roll.

Yet another object of the present invention is to provide an easy, quick change roll roller having auxiliary end adapters so that the same may be supported in holders having relatively large bearing openings.

Yet another object of the present invention is to provide an easy, quick change roll roller which may be made of hard plastic material and wherein the parts may be attractively colored for consumer appeal.

Other objects of the present invention are to provide an easy, quick change roll roller which is simple in design, inexpensive to manufacture, ruggedly constructed, easy to use and efficient in operation.

These and other objects will be readily evident upon a study of the following specification and accompanying drawing wherein.

Figure 1:
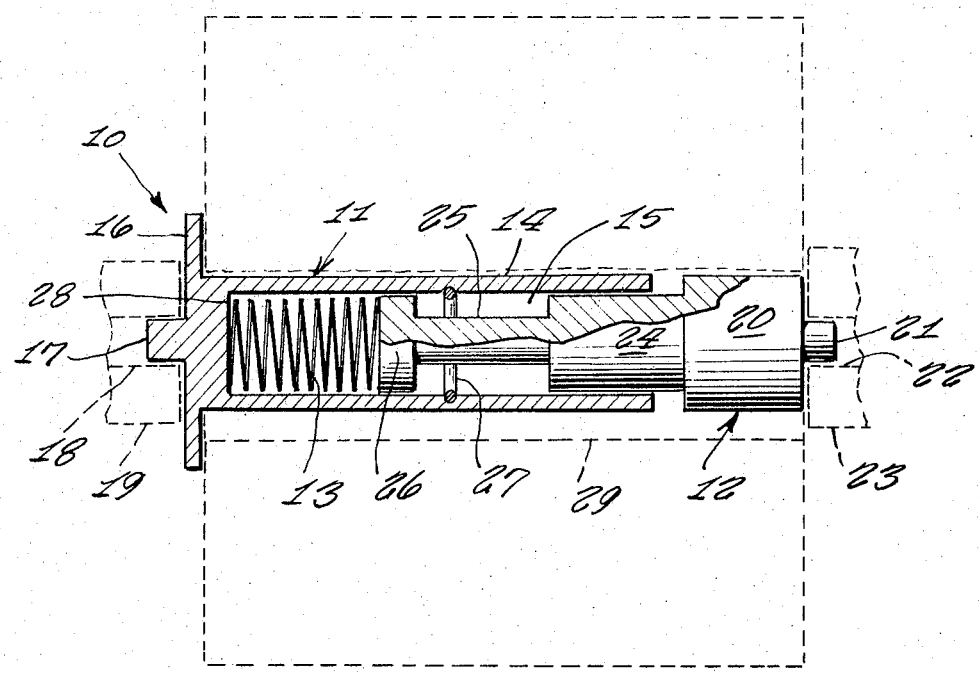
FIGURE 1 is a side elevation view of the present invention shown partly in cross-section and illustrating the same supporting a toilet tissue roll.
Figure 2:
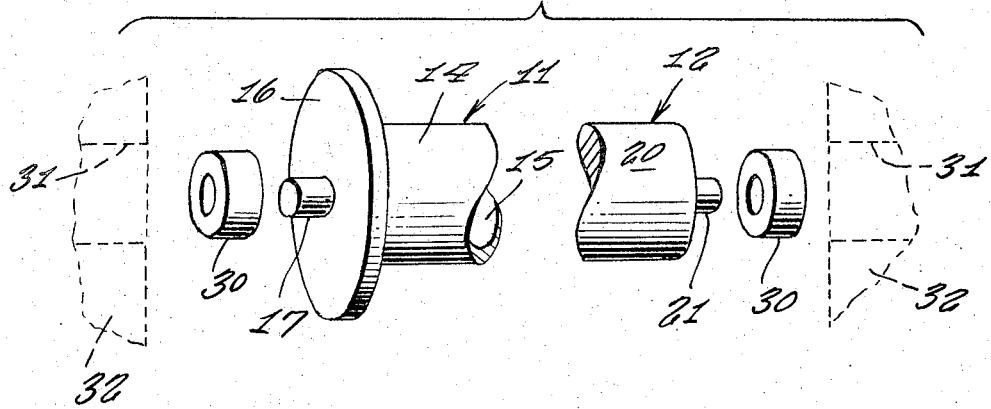
FIGURE 2 is a fragmentary exploded perspective view thereof and shown including end adapters therewith.

Referring now to the drawing in detail the numeral 10 represents an easy, quick change roll roller according to the present invention wherein there is a cylinder element 11 and a plunger element 12 slideably engageable with each other against the action of a compression coil spring 13.

The cylinder element 11 is comprised of a generally elongated cylindrical member 14 which encloses a control cylindrical compartment 15 therewithin, one end of the cylinder being open to receive the plunger 12 therewithin, and the opposite end of the cylindrical element 11 having an enlarged disk 16. Adjacent the disk 16 there is a terminal stub-shaft 17 which is receivable within a bearing 18 of a holder 19 of various design.

The plunger element 16 comprises a solid member of variously sized cylindrical portions, and including a cylindrical portion 20 which is of equal diameter as the outer diameter of the cylindrical portion 14 of the cylinder element 11. Adjacent one end on the cylindrical portion 20 there is a stub-shaft 21 which is receivable within a bearing 22 of a holder 23 of various design. Adjacent the other end of the cylindrical portion 20 there is a cylindrical portion 24 of lesser diameter so as to be slidable within the compartment 15 of the cylindrical element 11. Adjacent the cylindrical portion 24, there is a cylindrical stem 25 of generally elongated character and which has an enlarged cylindrical head 26 at its terminal end.

A snap ring 27 is internally mounted within the inner wall of the compartment 15 of the cylindrical element 11 at a point in alignment with the stem 25 when the elements 11 and 12 are assembled.

The compression coil spring 13 bears at one end against the enlarged head 26 and at its opposite end bears against a wall 28 that forms an in-wall of the compartment 15, the spring thereby normally urging the elements 11 and 12 apart.

In operative use, when it is desired to change toilet tissue rollers, the elements 11 and 12 are each withdrawn out of its specific end of the roll and then placed into its specific end of a new toilet tissue roll 29, the enlarged head 26 passing the snap ring 27 against the action of spring 13 thereby assembling the parts 11 and 12 together.

As an additional feature which forms a part of the present invention, an adapter 30 may be placed over each stub-shaft 17 and 21 to provide a larger diameter thereto corresponding to a larger opening 31 which comprise bearings in holder 32. Thus the present invention is readily adaptable for use in various design and size holders.

While various changes may be made in the detailed construction, it is understood that such changes will be within the spirit and scope of the present invention as is defined by the appended claim.

I claim:
1. In an easy, quick change roll roller, the combination of a cylinder element, a plunger element, said plunger element being receivable within said cylinder element, a compression coil spring, said compression coil spring normally urging said cylinder element and said plunger element apart, said cylinder element comprising an elongated cylinder, said cylinder enclosing a central compartment, said cylinder being open at one end to receive said plunger element therewithin, the opposite end of said cylinder element having an enlarged circular disk integral therewith and a terminal stub shaft integral therewith for being received within a bearing of a holder, said plunger element comprising a generally elongated member having a plurality of cylindrical portions, one of said cylindrical portions having a diameter equal to the outer diameter of said cylinder element, a stub shaft adjacent one end of said cylinder portion, said stub shaft being receivable within a bearing of a holder, a lesser diameter cylindrical portion adjacent the opposite end of said first cylindrical portion, the second said cylindrical portion being slideably receivable within said compartment of said cylinder element, an elongated stem adjacent said second cylindrical portion, an enlarged head adjacent the end of said stem, said enlarged head being adjacent one end of said compression coil spring and the opposite end of said compression coil spring bearing against an end wall of said compartment of said cylinder element, and a snap ring being fitted within an annular groove in the side wall of said compartment, said snap ring being in alignment with said stem, said snap ring being yieldable within said groove for permitting withdrawal movement therethrough of said plunger enlarged head, when said plunger and cylinder are forcibly parted or assembled and limiting said movement apart thereof under normal use, and said stub shaft of said cylinder and said stub shaft of said plunger each moveably receiving a cylindrical adapter for selectively fitting into holder bearings of different sizes.

References Cited

UNITED STATES PATENTS

| | | | |
|---|---|---|---|
| 1,045,311 | 11/1912 | Moberg | 242—55.2 |
| 2,313,776 | 3/1943 | Segal | 242—55.53 |
| 2,492,728 | 12/1949 | Balz | 242—55.2 |
| 2,889,122 | 6/1959 | McConnell | 242—55.2 |
| 3,224,700 | 12/1965 | Heinle | 242—55.53 |
| 3,239,158 | 3/1966 | Levesque | 242—55.53 |

GEORGE F. MAUTZ, *Primary Examiner.*